United States Patent
Kreutzer et al.

(10) Patent No.: US 12,372,142 B2
(45) Date of Patent: *Jul. 29, 2025

(54) THREADED NUT OF A BALL SCREW AND METHOD FOR PRODUCING SAME

(71) Applicant: Schaeffler Technologies AG & Co. KG, Herzogenaurach (DE)

(72) Inventors: Mario Kreutzer, Sonneberg (DE); Richard Baier, Aurachtal (DE); Claus Pfeffer, Gerhardshofen (DE); Thomas Kandler, Herzogenaurach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 132 days.

This patent is subject to a terminal disclaimer.

(21) Appl. No.: 18/265,791

(22) PCT Filed: Nov. 3, 2021

(86) PCT No.: PCT/DE2021/100873
§ 371 (c)(1),
(2) Date: Jun. 7, 2023

(87) PCT Pub. No.: WO2022/122070
PCT Pub. Date: Jun. 16, 2022

(65) Prior Publication Data
US 2024/0035553 A1    Feb. 1, 2024

(30) Foreign Application Priority Data

Dec. 9, 2020 (DE) ............ 10 2020 132 817.6

(51) Int. Cl.
*F16H 25/24* (2006.01)
*B21D 53/24* (2006.01)
*F16H 25/22* (2006.01)

(52) U.S. Cl.
CPC .......... *F16H 25/24* (2013.01); *B21D 53/24* (2013.01); *F16H 25/2214* (2013.01); *F16H 2025/2481* (2013.01); *F16H 2025/249* (2013.01)

(58) Field of Classification Search
CPC ............ F16H 25/24; F16H 25/2214; F16H 2025/2481; F16H 2025/249;
(Continued)

(56) References Cited

U.S. PATENT DOCUMENTS 2,441,580 A    5/1948  Mageoch
3,722,312 A *  3/1973  Better ............... F16H 25/2209
                                              74/89.42
(Continued)

FOREIGN PATENT DOCUMENTS

DE    4131486 A1    3/1993
DE    10062982 A1   6/2002
(Continued)

OTHER PUBLICATIONS

JP2009-204069—Partial Translation (Year: 2009).*

*Primary Examiner* — Jake Cook
(74) *Attorney, Agent, or Firm* — Matthew V. Evans

(57) ABSTRACT

The disclosure relates to a threaded nut of a ball screw, the threaded nut having an inner sleeve made of sheet metal and an outer sleeve made of sheet metal, which are nested axially in one another to form a nut sleeve. The nut sleeve is provided with a thread, which is formed helically about a longitudinal axis of the threaded nut and which forms, on the inner circumference of the nut sleeve, a ball groove wound helically about the longitudinal axis of the threaded nut and, and on the outer circumference of the nut sleeve, a helically wound outer ridge.

20 Claims, 11 Drawing Sheets

(58) Field of Classification Search
CPC ... F16H 25/2223; B21D 53/24; B21D 22/025; B21D 39/04; B21H 3/08
See application file for complete search history.

(56) References Cited

U.S. PATENT DOCUMENTS

| | | | |
|---|---|---|---|
| 4,074,587 A | 2/1978 | Brusasco | |
| 6,497,030 B1* | 12/2002 | Marando | B21D 26/051 29/523 |
| 6,851,330 B2* | 2/2005 | Buchanan, Jr. | F16H 25/2223 74/424.78 |
| 10,591,033 B2* | 3/2020 | Faber | B21D 22/00 |
| 11,326,674 B2* | 5/2022 | Ott | F16H 25/24 |
| 12,031,613 B2* | 7/2024 | Kreutzer | F16H 25/2204 |
| 12,072,005 B2* | 8/2024 | Kreutzer | B21D 39/04 |

FOREIGN PATENT DOCUMENTS

| | | |
|---|---|---|
| DE | 102011081966 A1 | 3/2013 |
| DE | 102016209119 A1 | 11/2017 |
| DE | 102018217960 A1 | 4/2020 |
| DE | 102019114276 A1 | 12/2020 |
| EP | 1226373 B1 | 7/2003 |
| FR | 2191676 A5 | 2/1974 |
| GB | 2000848 A | 1/1979 |
| JP | 2009204069 A * | 9/2009 |
| WO | 2013029842 A1 | 3/2013 |
| WO | 2020239164 A1 | 12/2020 |

\* cited by examiner

THREADED NUT OF A BALL SCREW AND METHOD FOR PRODUCING SAME

CROSS-REFERENCE TO RELATED APPLICATIONS

This application is the U.S. National Phase of PCT Application No. PCT/DE2021/100873 filed on Nov. 3, 2021, which claims priority to DE 10 2020 132 817.6 filed on Dec. 9, 2020, the entire disclosures of which are incorporated by reference herein.

TECHNICAL FIELD

The present disclosure relates to a threaded nut of a ball screw.

BACKGROUND

Ball screws convert a relative rotation of the threaded nut and threaded spindle into a relative displacement of the threaded nut and threaded spindle. Balls are arranged between the threaded spindle and the threaded nut in a ball channel which is wound helically about a spindle axis and is delimited by ball grooves which are wound helically about the spindle axis and which are formed on the threaded nut and on the threaded spindle. In most designs, the ball channels are endless; they are made of a load section and a return section that connects a start to an end of the load section. The load section is formed by the ball grooves of the threaded spindle and the threaded nut. The return section is formed depending on the type of ball screw. The threaded nut is usually provided with through-holes on its lateral surface, into which, in the case of a single deflection, deflector pieces, or in the case of what is termed an external deflection, deflection tubes are inserted at the ends. In the case of single deflection, the deflector piece connects one end of a turn of the load section to a beginning of said turn. In the case of external deflection, the deflection tube or deflection element connects a start of a first turn of the load section to an end of a last turn of the load section. Consequently, the load section can comprise several turns.

Ball screws are known, for example, from DE 10 2016 209 119 A1, the threaded nut of which is made of sheet metal and is provided with a ball groove produced by forming technology through thread forming. A connecting part formed by a flange is integrally formed on an axial end of the sleeve-shaped threaded nut in order to connect the threaded nut to a machine part.

In numerous applications, the threaded nuts are permanently connected to machine parts and should be easy to weld, for example. The ball grooves of the threaded nuts should be easily hardenable. These different requirements for the material properties must be taken into account when selecting materials. The restrictions in the selection of materials resulting from the requirements can lead to considerable effort in the production of the threaded nut. For example, if good weldability is a priority, carburization is required for heat treatment to provide sufficient hardness.

SUMMARY

It was the object of the present disclosure to specify a threaded nut of a ball screw according to the features described herein, which can be produced particularly economically.

The threaded nut of a ball screw is provided with an inner sleeve made of sheet metal and with an outer sleeve made of sheet metal, which are nested axially in one another to form a nut sleeve.

The sleeves, which can be produced by forming technology, can have a smooth cylindrical design. The diameters of the lateral surfaces facing one another are matched to one another for a close play or a press connection. The sleeves nested together in this manner form the nut sleeve.

The nut sleeve is provided with a thread helically formed about a longitudinal axis of the threaded nut, which forms a helically wound ball groove around the longitudinal axis of the threaded nut on the inner circumference of the nut sleeve and a helically wound outer ridge on the outer circumference of the nut sleeve. Forming the thread means forming both sleeves along the path of the thread.

The ball groove of the threaded nut, together with a helical ball groove of a threaded spindle of the ball screw, forms a load section of a ball channel in which the balls—in the case of a ball screw with ball return—revolve endlessly.

This threaded nut enables a function-related selection of steels for the inner sleeve and the outer sleeve. The outer sleeve can be formed, for example, from an easily weldable sheet steel if the threaded nut is to be welded to a machine part. The inner sleeve can be made of sheet steel that can be easily hardened, which enables the ball groove to be sufficiently hard for the balls.

The thread formed in the nut sleeve causes a positive engagement of the inner sleeve and the outer sleeve with one another with regard to an axial load on the threaded nut. Seen in longitudinal section through the thread of the threaded nut, the two casings of the sleeves are arched and engage with one another. A convex curvature of the inner sleeve engages a concave curvature of the outer sleeve.

In an example embodiment, the outer circumference of the inner sleeve forms an inner ridge which is wound helically about the longitudinal axis and is convexly curved. A helically wound groove is formed on the inner circumference of the outer sleeve, into which the inner ridge of the inner sleeve engages.

In a further development, it is provided that the threaded nut is provided with at least one outer hole which is formed along the thread on the outer sleeve, in which the material of the inner sleeve is formed. The forming of material supports a non-rotatable connection of the two nested sleeves, because this forming means an engagement of the inner sleeve in the outer sleeve, so that there is a positive connection between the two sleeves in the circumferential direction.

The hole in the outer sleeve can be covered by the casing of the inner sleeve, the material of which is formed in this hole. If the thread is made in a forming process with a forming tool that forms the ball groove on the inner circumference of the inner sleeve, material from the inner sleeve runs into the hole in the outer sleeve because the inner sleeve is not radially supported at this point and the sleeve casing is deformed slightly radially outwards.

In an example embodiment, a ball screw with ball return has a nut sleeve which has at least one through-hole for the return of balls along the thread, which is formed by an inner hole of the inner sleeve and by the outer hole of the outer sleeve. The outer hole or holes may already be punched on the outer sleeve before both sleeves are nested together. The inner hole or holes can be punched or cut after the two sleeves have been joined together and the thread with the ball groove has been formed on the nut sleeve. Since only the wall thickness of the inner sleeve has to be penetrated in order to provide the through-hole, the applied tool forces can be reduced to such an extent that undesired deformations of the nut sleeve do not occur.

Multiple holes in the threaded nut may be required to provide this ball screw with ball return. In the case of the single deflection mentioned above, one hole is required for each deflector piece, which endlessly connects one end to the start of a common turn of the load section of the ball channel. In the case of an external deflection, there are two holes in each case into which the ends of a deflection element arranged on the outer circumference of the nut sleeve engage, which endlessly connects an end of a last turn with a start of a first turn of the load channel.

First, several outer holes can be made in the outer sleeve via a punching process. Punching the outer holes is technically easy to do. After the thread has been provided, the inner holes can be introduced into the inner sleeve, so that through-holes are formed in the nut sleeve, which are set up for receiving the deflector pieces or deflection elements mentioned.

Usually, in ball screws with ball return, the transition from the load section to the return section of the ball channel on the threaded nut is designed as a ball inlet ramp, which serves to gradually unload/load the balls in a manner known per se when they move from the load section to the return section of the endless ball channel or vice versa. These ball inlet ramps at the transition between the ball groove to the edge of the inner hole only extend a few hundredths of a millimeter in the circumferential direction and in the radial direction. These ball inlet ramps can be formed when the forming tool forms the thread with the ball groove.

At the edge of the inner hole, the inner sleeve has a formed edge section which forms a ball inlet ramp. This formed edge section can be produced in a favorable manner by means of the above-mentioned forming tool, while the ball groove is being formed and the inner sleeve is not supported on the outer sleeve.

The through-hole can have a larger outer hole on the outer sleeve and a smaller hole on the inner sleeve. In this way, on the one hand, the production of the ball inlet ramp is made easier, and on the other hand, space is created for inserting a deflection tube of an external deflection.

The threaded nut can be provided with a connecting component on at least one axial end of the nut sleeve; for example, the inner sleeve and/or the outer sleeve can be connected to a flange or a bearing ring.

The inner sleeve and/or the outer sleeve can be made of sleeve parts arranged to be axially adjacent. This can be expedient if, for example, one sleeve part merges monolithically into a bearing ring of a deep-groove ball bearing and a different core hardness is required for this bearing ring compared to the sleeve. In these cases, this sleeve part is also part of the connecting component.

A heat treatment of the threaded nut can be carried out after the above-described forming technology and machining work steps.

The inner sleeve can be made of sheet steel with a carbon content greater than 0.3% and the outer sleeve is made of sheet steel with a carbon content of less than 0.3%. A sheet steel made of the material C80 can be used in a favorable manner for the inner sleeve, with which a comparatively high hardness HRC can be achieved after the heat treatment. The inner sleeve supports the ball groove on which the balls roll under load.

For the outer sleeve, on the other hand, a steel sheet made of the materials 16MnCr5 or DC04 can be used in a favorable manner, which can enable improved weldability due to the lower carbon content.

An example method for producing the threaded nut described provides the following steps:

An inner sleeve made of sheet metal—which can be cylindrical—and an outer sleeve made of sheet metal—which can also be cylindrical—are nested and joined axially in one another in the form of a nut sleeve. Conveniently, the outer sleeve can already be provided with the above-mentioned outer holes, which can be punched before the two sleeves are joined together.

The nut sleeve is inserted into a die, on the inner circumference of which a groove is formed on the die side, which is formed helically about the axis of the threaded nut. This die-side groove has the slope of the ball groove, which is formed in the manner described below.

A forming tool moves into the nut sleeve and forms a thread in the nut sleeve wound helically about a longitudinal axis, which forms a helically wound ball groove of the threaded nut on the inner circumference of the nut sleeve, and which forms a helically wound outer ridge along the thread on the outer circumference of the nut sleeve, which runs into the groove on the die side.

What is termed a thread former, which is arranged coaxially to the axis of the threaded nut and rotates about its axis, thereby forming the thread, can be used as the forming tool. Alternatively, in the case of large internal diameters of the threaded nut, roller burnishing tools can be used, the rollers of which form the thread with the ball groove.

The forming tool is in direct contact with the inner sleeve; the acting forming force creates the ball groove and deforms the casing of the inner sleeve along the thread to form the inner ridge, which under the acting circumferential force forms the outer sleeve along the thread, so that the helically wound groove is formed on the inner circumference of the outer sleeve and the outer ridge is formed on the outer circumference of the outer sleeve. The inner ridge of the inner sleeve engages in the groove of the outer sleeve and the outer ridge of the outer sleeve engages in the groove on the die side, i.e., the material of the outer sleeve runs into the groove on the die side.

Due to the thread engagement in the axial direction, the nut sleeve provided in this way has a form fit between the two sleeves. There is a sufficiently large frictional contact between these two sleeves, so that both sleeves are arranged in a non-rotatable manner in the circumferential directions.

When the outer sleeve is punched with the outer holes along the thread before the outer sleeve is nested with the inner sleeve to form the nut sleeve, under the forming force of the forming tool, material of the inner sleeve runs into the outer hole to form the formed edge section in the region of an edge of the outer holes. After the ball groove is formed, the inner holes on the inner sleeve can be punched or cut out to form the through-holes for the endless ball channels.

In the method described above, the formed edge section is given its contour as a ball inlet ramp even before the inner holes are punched. In one variant, it is possible for the ball inlet ramp to be produced by punching the inner holes when the punching tool moves radially from the inside to the outside and pulls material into the outer hole.

After completing these process steps, the threaded nut can be removed from the die and hardened in a heat treatment process.

It has already been stated above that the inner sleeve can be made of sheet steel with a carbon content greater than 0.3% and the outer sleeve is made of sheet steel with a carbon content of less than 0.3%.

In this way, a martensitic or a bainitic structure with a higher proportion of martensite or bainite can be produced in the inner sleeve with the heat treatment, and a minimal or no proportion of martensite or bainite can be produced in the outer sleeve.

The higher proportion of martensite or bainite in the inner sleeve causes the inner sleeve to increase in hardness. As a result, the connection between the inner and outer sleeves is improved, since the inner sleeve exerts a radial prestressing force on the outer sleeve due to its increase in hardness.

BRIEF DESCRIPTION OF THE DRAWINGS

The disclosure is explained in more detail below with reference to seven exemplary embodiments shown in a total of 22 figures.

In the figures.

DETAILED DESCRIPTION

Figure 1:
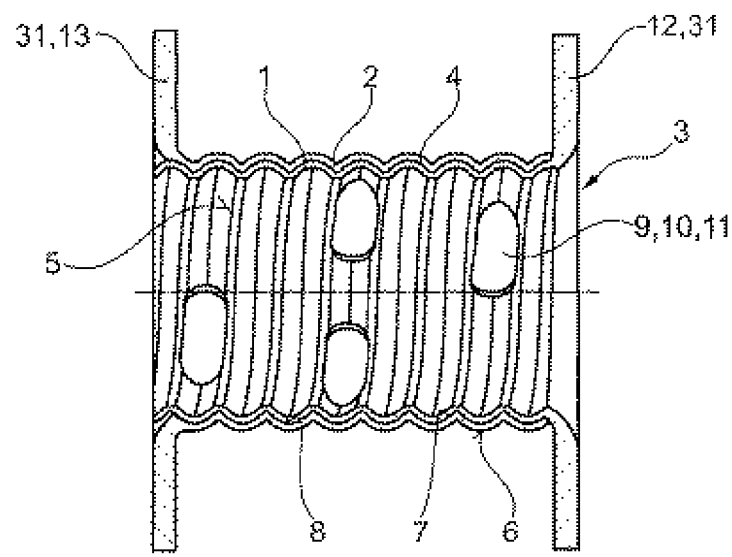
FIG. 1 shows a longitudinal sectional view through a first variant of a threaded nut.

The threaded nut of a ball screw with external deflection shown in FIG. 1 is provided with an inner sleeve 1 made of sheet metal and an outer sleeve 2 made of sheet metal, which are nested axially in one another to form a nut sleeve 3.

A ball screw with external deflection has an endless ball channel, which is made of a load section and a return section. In the load section, balls roll under load on the ball grooves of the threaded nut and the threaded spindle. In the return section, the balls are returned with no load from an end of the load section to a beginning of the load section. The load section winds around the spindle axis for more than one turn. A deflection element is used for this purpose.

The nut sleeve 3 is provided with a thread 4 helically formed about a longitudinal axis of the threaded nut, which forms a ball groove 5 wound helically about the longitudinal axis of the threaded nut on the inner circumference of the nut sleeve 3 and a helically wound outer ridge 6 on the outer circumference of the nut sleeve 3.

The ball groove 5 of the threaded nut, together with a helical ball groove of a threaded spindle of the ball screw, not shown here, forms a load section of a ball channel in which the balls rotate endlessly.

This threaded nut enables a function-related selection of steels for the inner sleeve 1 and the outer sleeve 2. The outer sleeve 2 can be formed, for example, from an easily weldable sheet steel if the threaded nut is to be welded to a machine part. The inner sleeve 1 can be made of sheet steel that can be easily hardened, which enables the ball groove 5 to be sufficiently hard for the balls.

The thread 4 formed in the nut sleeve 3 causes a positive engagement of the inner sleeve 1 and the outer sleeve 2 with one another with regard to an axial load on the threaded nut. Seen in a longitudinal section through the thread of the threaded nut, the two casings of the sleeves 1, 2 are arched along the thread 4 and engage with one another. A convex curvature of the inner sleeve 1 engages in a concave curvature of the outer sleeve 2 along the thread 4.

On the outer circumference of the inner sleeve 1 there is an inner ridge 7 which is wound helically about the longitudinal axis and is convexly curved. A helically wound groove 8 is formed on the inner circumference of the outer sleeve 2, into which the inner ridge 7 of the inner sleeve 1 engages.

This nut is intended for a ball screw with ball return, namely with external deflection. In the case of an external deflection, two holes for each endless ball channel are formed in the casing of the threaded nut, into which the ends of a deflection element—not shown here—arranged on the outer circumference of the nut sleeve engage, which deflection element has a return channel for the balls, and one end of a last turn endlessly connects to a beginning of a first turn of the load section.

In this exemplary embodiment, four through-holes 9 distributed over the circumference are formed along the thread 4 for the return of balls, with two of these through-holes 9 being provided for a deflection element. Each through-hole 9 is formed by an inner hole 10 of the inner sleeve 1 and an outer hole 11 of the outer sleeve 2.

Both sleeves 1, 2 are made in one piece at their ends facing away from each other, each with a radial flange 12, 13. These radial flanges 12, 13 are connecting components 31 for connecting the threaded nut to machine parts.

Figure 2:
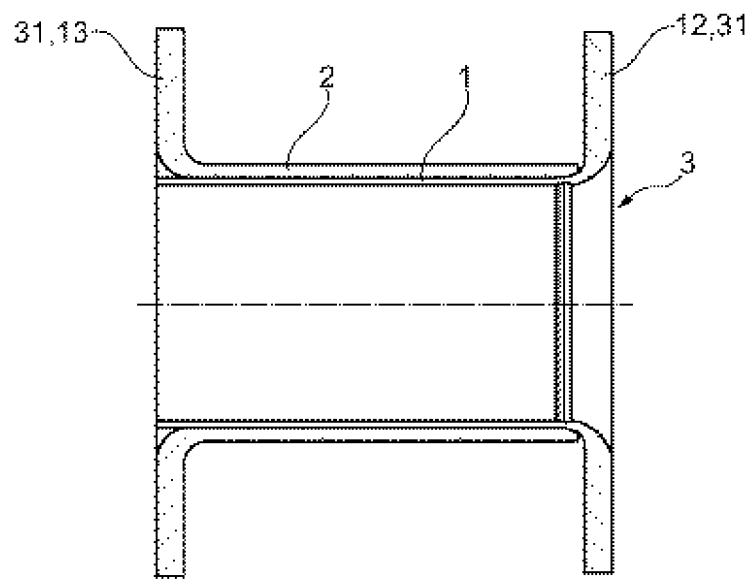
FIG. 2 shows a longitudinal sectional view through a nested nut sleeve.

FIG. 2 shows the nut sleeve 3 with the nested sleeves 1, 2, which here have smooth-cylindrical lateral surfaces and are produced in one piece with the radial flanges 12, 13.

Figure 3:
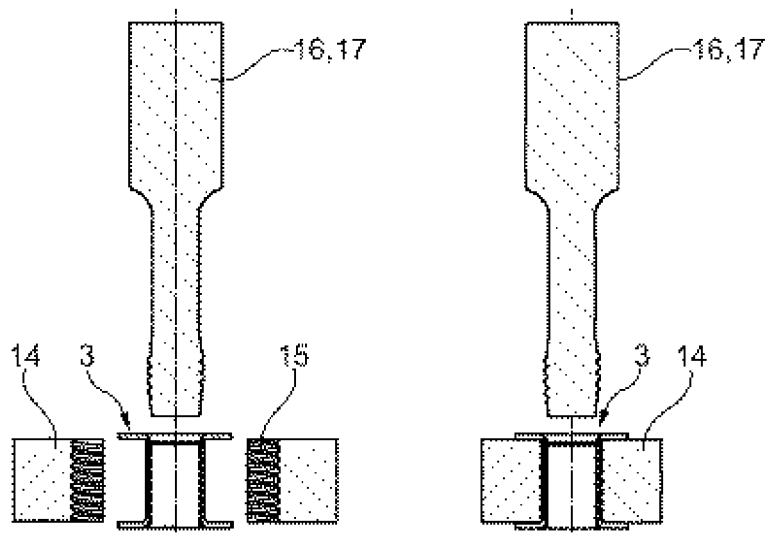
FIGS. 3 and 4 show a method for further processing the sleeves of FIG. 2.
Figure 4:
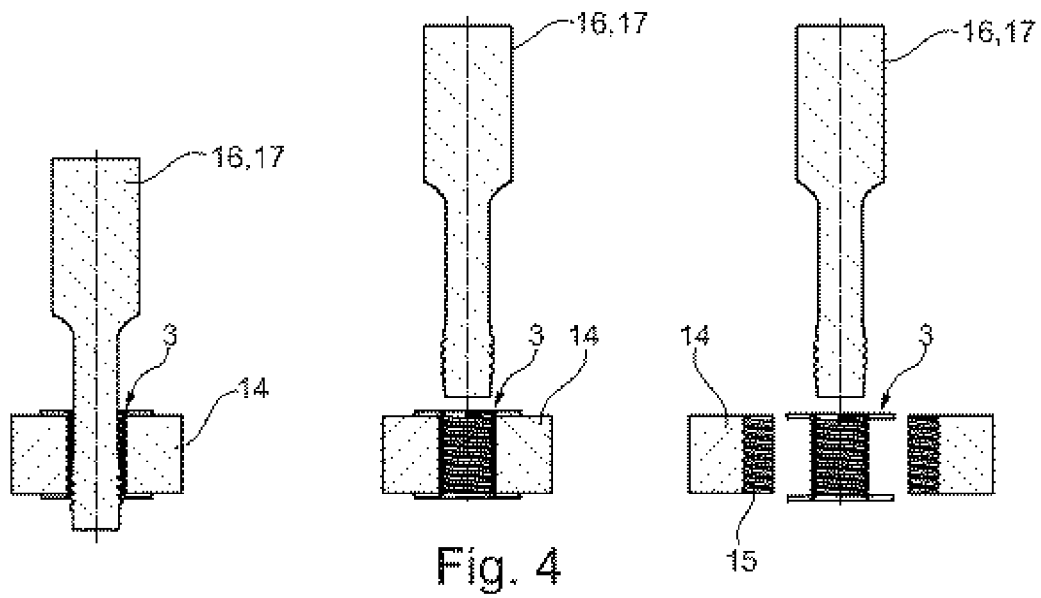

The introduction of the thread 4 is explained with reference to FIGS. 3 and 4. The nut sleeve 3—only shown in sketched form here—is inserted into a die 14, on the inner circumference of which a groove 15 wound helically about the axis of the threaded nut is formed on the die side. This die-side groove 15 has the slope of the ball groove 5, which is formed in the manner described below. The multi-part die 14 is opened radially for inserting the nut sleeve 3 provided with radial flanges 12, 13; this means that the die parts move away from each other so that the nut sleeve 3 can be inserted (FIG. 3, left) and then the die 14 is closed again (FIG. 3, right).

A forming tool 16 moves into the nut sleeve 3 (FIG. 4, left) and forms the thread 4 in the nut sleeve 3 which is wound helically about the longitudinal axis, which forms the helically wound ball groove 5 of the threaded nut on the inner circumference of the nut sleeve 3, and which forms the helically wound outer ridge 6 along the thread 4 on the outer circumference of the nut sleeve 3 which runs into the groove 15 on the die side. After thread forming, the thread former 16 moves out of the nut sleeve 3 (FIG. 4, center) and the die 14 is opened again (FIG. 4, right).

What is termed a thread former 17, which is arranged to be coaxial to the axis of the threaded nut and rotates about its axis and forms the thread 4 with axial feed, can be used as the forming tool 16 in this exemplary embodiment. Alternatively, in the case of large internal diameters of the threaded nut, roller burnishing tools can be used, the rollers of which form the thread with the ball groove.

The thread former 17 is in direct contact with the inner sleeve (FIG. 4, left); the acting forming force creates the ball groove 5 and deforms the casing of the inner sleeve 1 along the thread 4 to form the inner ridge 7, which under the acting circumferential force forms the outer sleeve 2 along the thread 4, so that the helically wound groove 8 is formed on the inner circumference of the outer sleeve 2 and the outer ridge 6 is formed on the outer circumference of the outer sleeve 2. The inner ridge 7 of the inner sleeve 1 engages in the groove 8 of the outer sleeve 2 and the outer ridge 6 of the outer sleeve 2 engages in the groove 15 on the die side, i.e., under the forming force of the thread former 17, the material of the nut sleeve 3 runs into the groove 15 on the die side.

Figure 5:
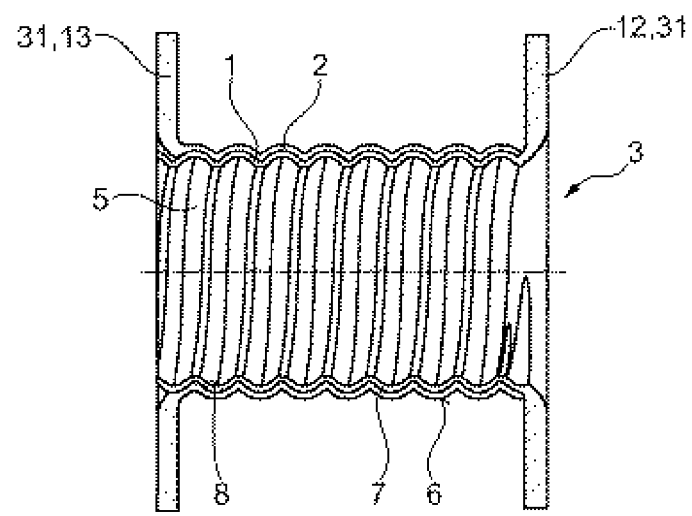
FIG. 5 shows the nut sleeve of FIG. 2 with the formed thread.

FIG. 5 shows the nut sleeve 3 provided in this manner, which has a form fit between the two sleeves 1, 2 in the axial direction due to the thread engagement. There is a sufficiently large frictional contact between these two sleeves 1, 2, so that both sleeves 1, 2 are arranged in a non-rotatable manner in the circumferential directions.

The through-holes 9 shown in FIG. 1 are punched into this nut sleeve 3.

FIGS. 6 to 11 show a second exemplary embodiment of a threaded nut, which differs from the threaded nut described above in that the through-holes are produced in different steps.

Figure 6:
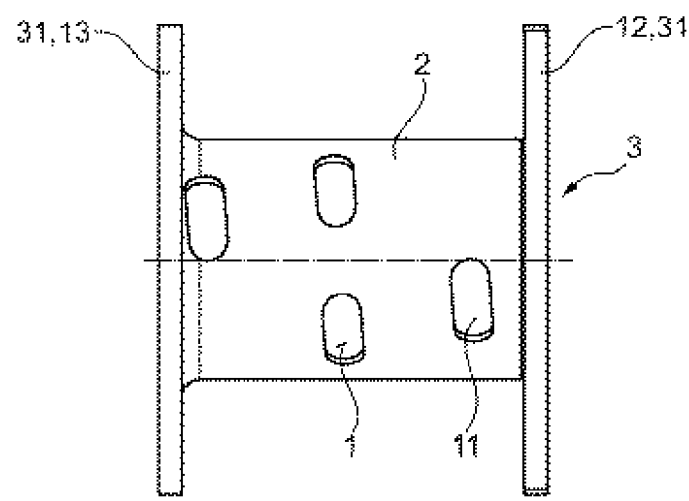
FIG. 6 shows a second variant of the nut sleeve.

FIG. 6 shows the sleeves 1, 2 nested with one another, as in FIG. 1, but with the difference that the outer sleeve 2 has already been provided with the outer holes 11 before the two sleeves 1, 2 are nested with one another. The outer holes 11 can be provided by punching. The punching of the outer holes 11 on the outer sleeve 2 is technically easy to carry out.

Figure 7:
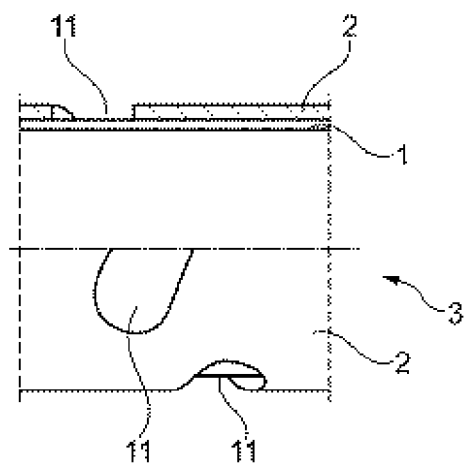
FIG. 7 shows a section of a nut sleeve as shown in FIG. 6 in a longitudinal sectional view.

FIG. 7 shows sections of sleeves 1, 2 nested with one another in a longitudinal section. The inner sleeve 1 covers the outer holes 11 with its cylindrical lateral surface. This figure refers to a ball screw with a single deflection for the balls and is only included here for the sake of clarity. It shows how the smooth-cylindrical sleeves 1, 2 are nested in one another and that the inner sleeve 1 does not yet have any holes and covers the outer holes of the outer sleeve 2. The shape and location of the outer holes 11 differs somewhat from the shape and location of the outer holes of the threaded nut described above.

Figure 8:
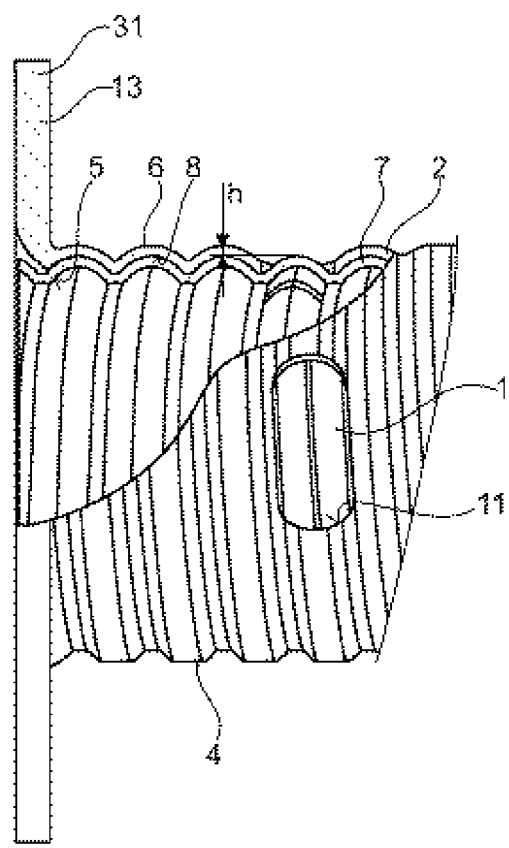
FIG. 8 shows a further section of the nut sleeve of FIG. 6 with a formed thread.

FIG. 8 shows the nut sleeve 3 from FIG. 6 after the thread 4 has been produced in the same way as in the previous example. While the thread 4 is being formed, material from the inner sleeve 1 runs into the outer holes 11 of the outer sleeve 2 because the inner sleeve 1 is not radially supported at these points and the sleeve casing of the inner sleeve 1 is deformed radially slightly outwards under the force of the forming tool. In FIG. 8, the overhang with which the inner sleeve 1 engages in the outer hole 11 is indicated with "h".

Figure 9:
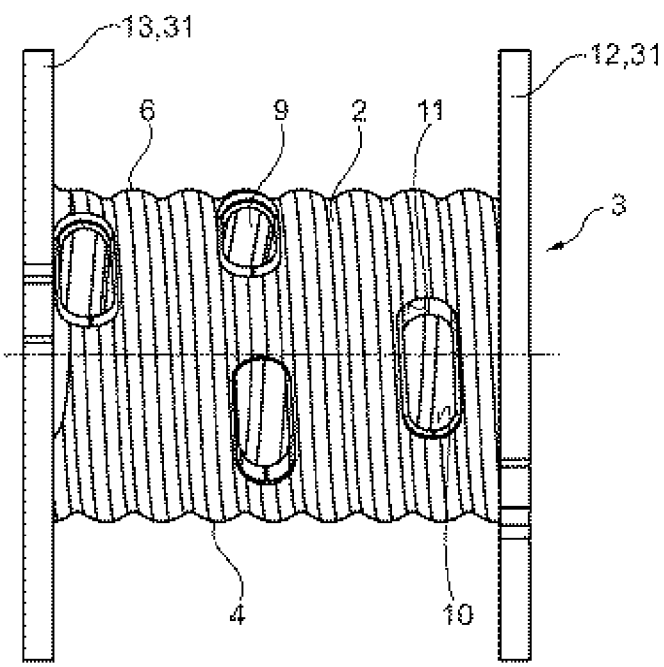
FIG. 9 shows a view of the second variant of the threaded nut.
Figure 10:
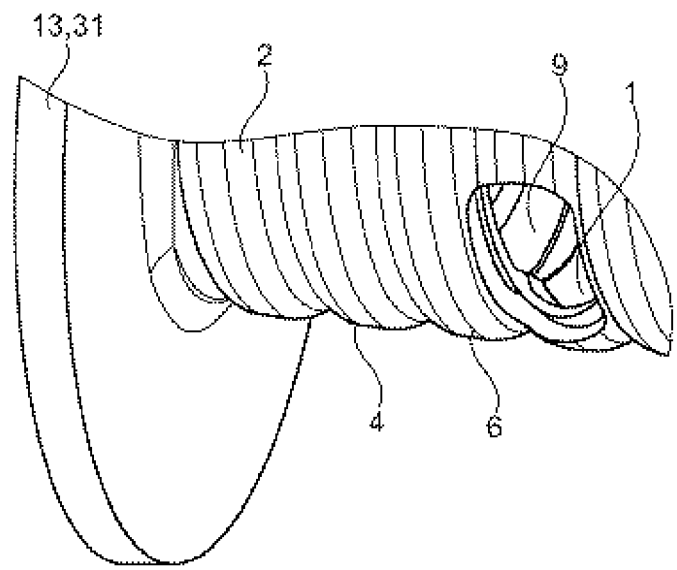
FIG. 10 shows a section of the threaded nut of FIG. 9 in a perspective view.
Figure 11:
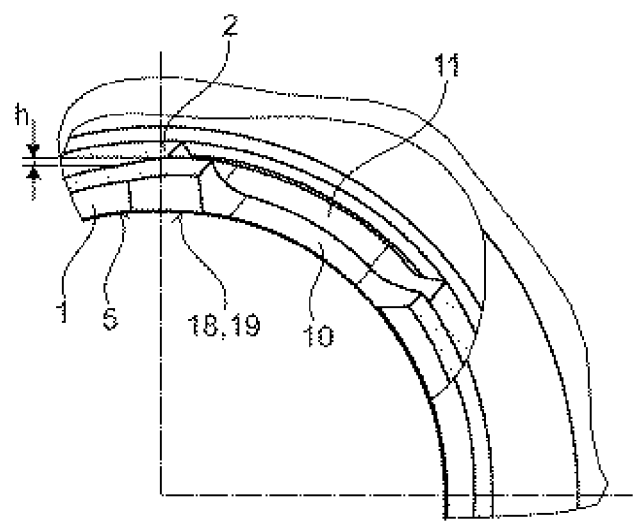
FIG. 11 shows a further section of the threaded nut of FIG. 9 in cross-section.

The inner holes 10 are now punched or milled into the nut sleeve 3 prepared in this way. FIGS. 9 to 10 show the through-holes 9 in different representations. It can be clearly seen from FIG. 9, for example, that the outer hole 11 is larger than the inner hole 10, both in the axial and in the circumferential direction. The outer surface of the outer hole 11 is outside the clear opening of the inner hole 10.

The inner holes 10 are consequently punched or cut after the two sleeves 1, 2 are joined together and the thread 4 with the ball groove 5 is formed onto the nut sleeve 3. Since only the wall thickness of the inner sleeve 1 has to be penetrated in order to provide the through-hole 9, the applied tool forces can be reduced to such an extent that undesired deformations of the nut sleeve 3 do not occur. The somewhat smaller inner hole 10 allows for easier punching out, because the tool can be dimensioned to be correspondingly small, so that the outer sleeve 2 is not touched on its perforated casing delimiting the outer hole 11.

Even after the inner holes 10 have been punched, the material of the inner sleeve 1 grips into the outer hole 11 of the outer sleeve 2. The forming of material supports a non-rotatable connection of the two nested sleeves 1, 2, because this forming means an engagement of the inner sleeve 1 in the outer sleeve 2, so that there is a positive connection between the two sleeves 1, 2 in the circumferential direction.

By forming the thread 4 onto the nut sleeve 3 as described above and forming the material of the inner sleeve 1 into the outer hole 11, a formed edge section 18 (FIG. 11) is created, which leaves the circular arc shape of the ball groove 5 radially outwards and forms a ball inlet ramp 19, which serves for the gradual loading and unloading of balls that come from the return section into the load section of the endless ball channel, or vice versa. These ball inlet ramps 19 at the transition between the ball groove 5 to the edge of the inner hole 10 only extend a few hundredths of a millimeter in the circumferential direction and in the radial direction. These ball inlet ramps 19 are formed when the forming tool forms the thread 4 with the ball groove 5.

Figure 12:
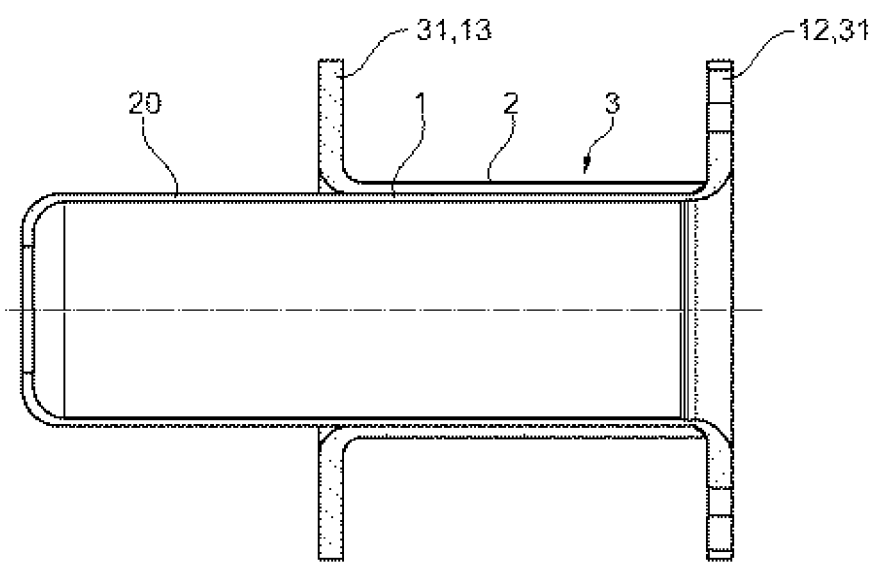
FIG. 12 shows a third variant of the nut sleeve in a longitudinal sectional view.
Figure 13:
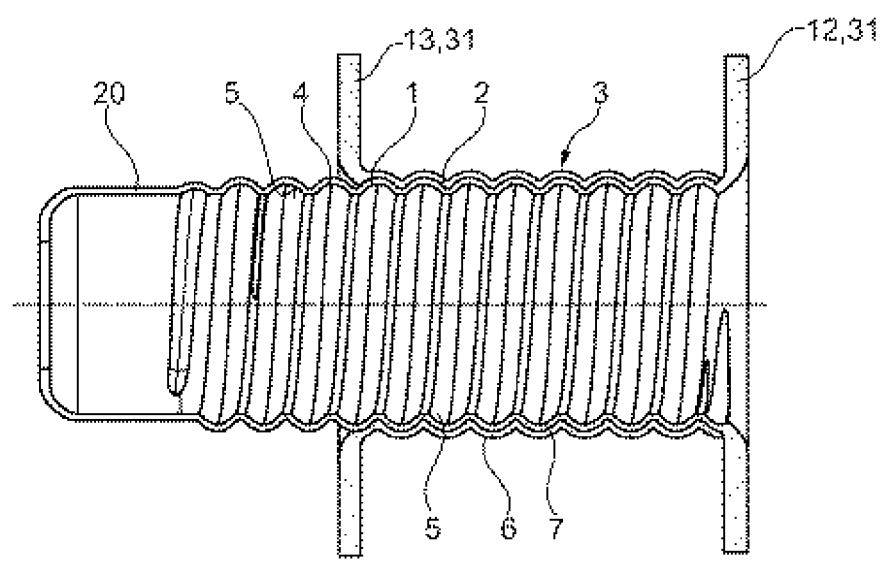
FIG. 13 shows the nut sleeve of FIG. 12 with a formed thread.

FIGS. 12 and 13 show a production sequence of the thread of the nut sleeve 3 of a third variant of a threaded nut, as has already been described for the first embodiment. Here, however, a clamping section 20 is set up on the inner sleeve 1 as an extension of the inner sleeve 1. This clamping section 20 serves to hold the nut sleeve 3 when the through-holes are made. This clamping section 20 can eventually be severed.

Figure 14:
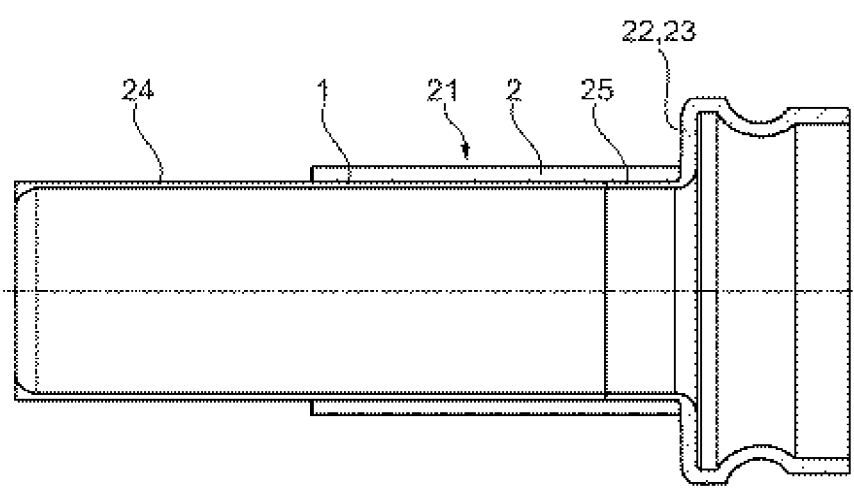
FIG. 14 shows a fourth variant of the nut sleeve in a longitudinal sectional view.
Figure 15:
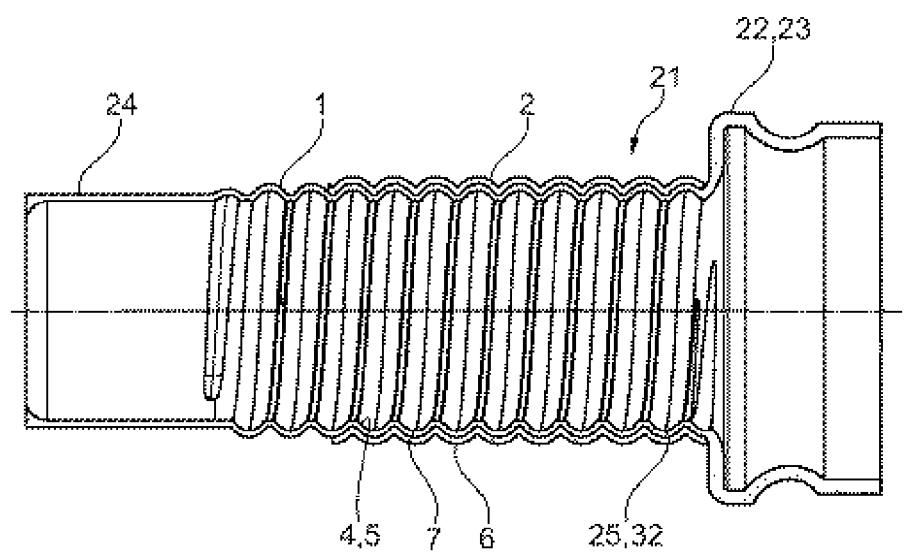
FIG. 15 shows the nut sleeve of FIG. 14 with a formed thread.

FIGS. 14 and 15 show a fourth nut of a ball screw with single deflection, which differs from the nut of the first embodiment essentially in that the nested sleeves 1, 2 form a nut sleeve 21, which is only firmly connected to a bearing ring 22 as a connecting component 23 instead of a radial flange. The bearing ring 22 is part of a four-point bearing, not shown here, with a main load direction in order to rotatably mount the threaded nut on a machine part. At one axial end, the bearing ring 22 has a hollow-cylindrical socket 25 formed thereon, the diameter of which corresponds to that of the inner sleeve 1 and engages in the outer sleeve 2 axially adjacent to the inner sleeve 1. The socket 25 can also be referred to as a sleeve part 32 of a multi-part inner sleeve 1.

As in the exemplary embodiment in FIGS. 12 and 13, a clamping section 24 is designed here as an extension of the inner sleeve 1, which can finally be separated. Apart from these deviations, this nut is produced in the same manner as specified for the first exemplary embodiment.

The through-holes in this third embodiment are machined in the same manner as described in the first embodiment.

Figure 16:
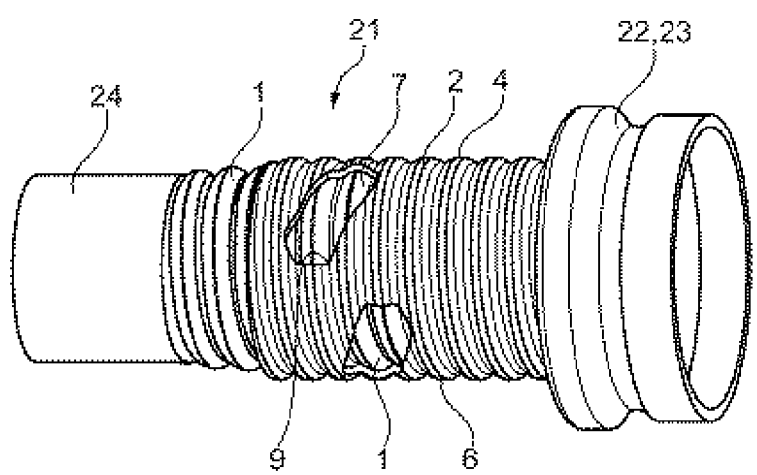
FIG. 16 shows the threaded nut according to the fifth variant in a perspective view.
Figure 17:
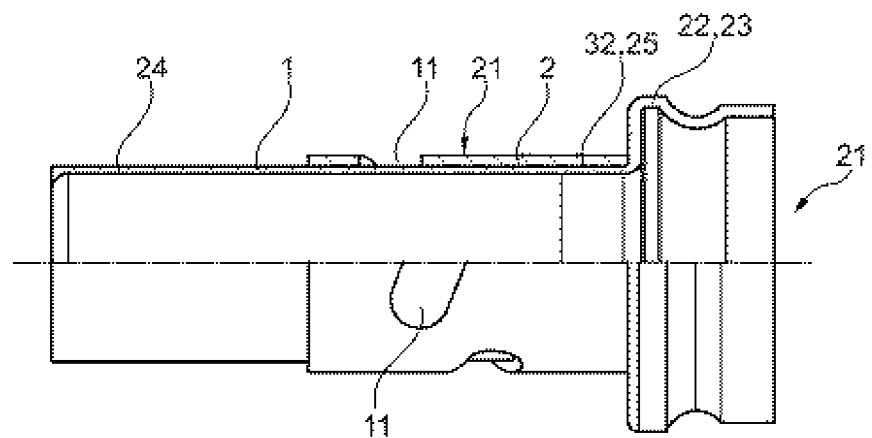
FIG. 17 shows a view of the fifth variant of the nut sleeve in a longitudinal half-sectional view during a production stage before the threaded nut is completed.
Figure 18:
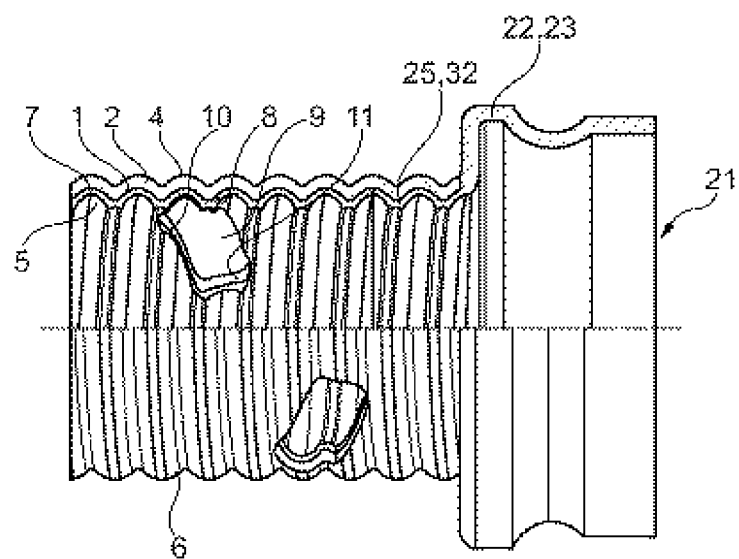
FIG. 18 shows the threaded nut according to the fifth variant in a longitudinal sectional view.

FIGS. 16 to 18 show a fifth threaded nut of a ball screw with single deflection, which differs from the threaded nut of the third exemplary embodiment shown in FIGS. 14 and 15 essentially in that the through-holes are produced in the manner described for the second exemplary embodiment.

Furthermore, in this embodiment, the through-holes are designed for a ball screw with single deflection. In the case of the single deflection, a deflector piece is inserted into the through-hole, which endlessly connects an end of the load section with a beginning of the load section of a common turn.

FIGS. 16 and 17 clearly show the outer hole 11 with the casing of the inner sleeve 1 lying underneath, the material of which is also formed into the outer hole 9, as is described for the second exemplary embodiment.

In this exemplary embodiment, too, the outer hole 11 is somewhat larger than the inner hole 10, as can be seen from FIG. 18.

Figure 19:
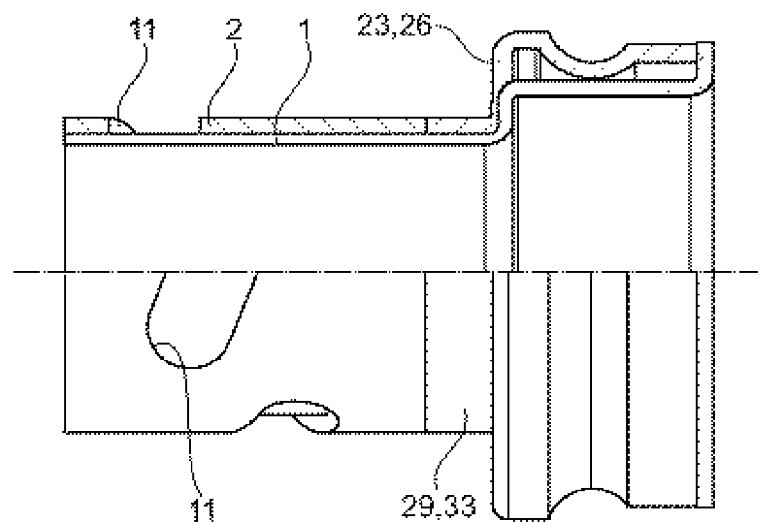
FIG. 19 shows a sixth variant of the nut sleeve in a longitudinal sectional view.
Figure 20:
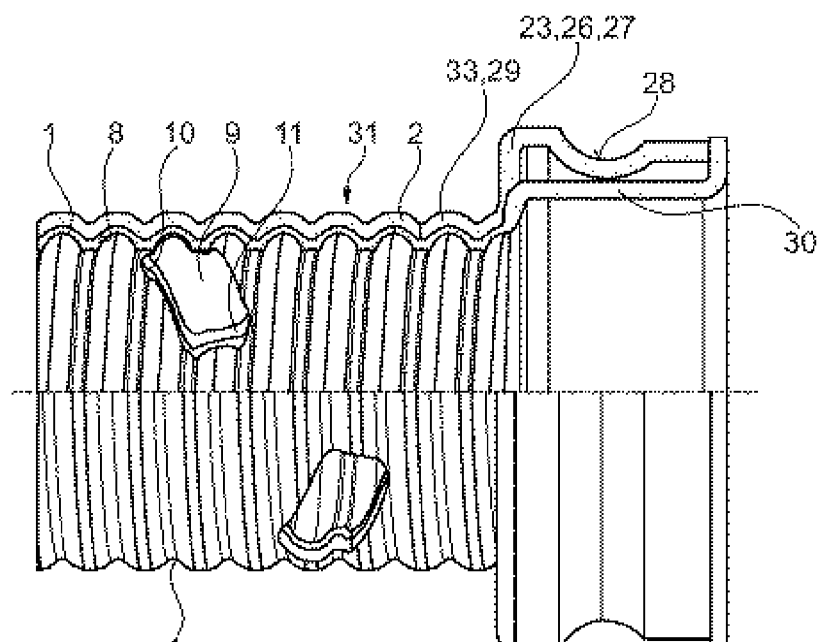
FIG. 20 shows the threaded nut according to the sixth variant in a longitudinal sectional view.
Figure 21:
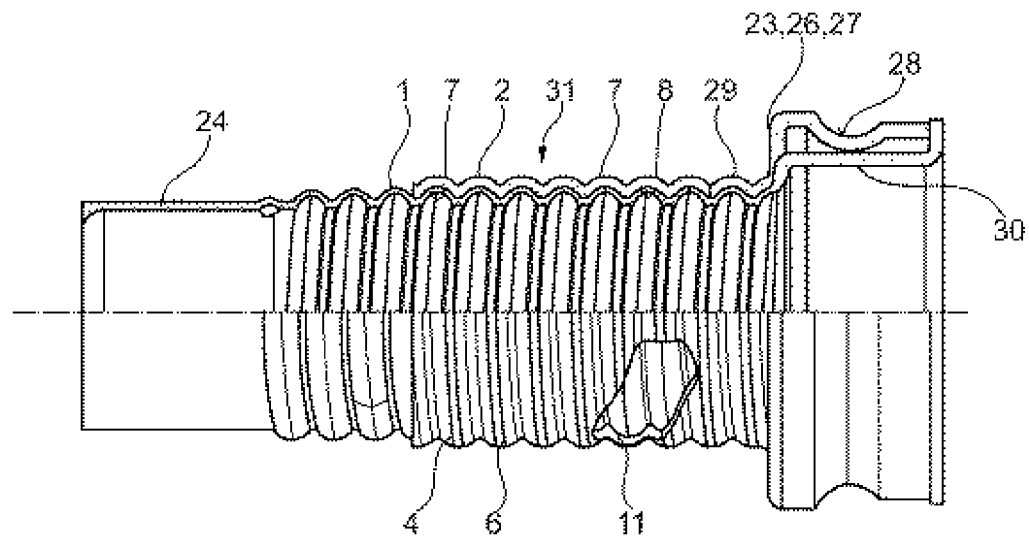
FIG. 21 shows a further longitudinal sectional view.

The threaded nut shown in FIGS. 19 to 21 is a sixth exemplary embodiment. This threaded nut differs from the threaded nut according to the fifth exemplary embodiment only in that the connecting component 23 is formed by a modified bearing ring 26, and that a nut sleeve 31 with its outer sleeve 2 is built somewhat shorter at one axial end than the inner sleeve 2.

This bearing ring 26 is designed in several parts; it has an outer ring part 27 with a ball groove 28 of a deep groove ball bearing, at one axial end of which a tubular socket 29 is formed, the diameter of which corresponds to the diameter of the outer sleeve 2 and which is arranged to be axially adjacent to the outer sleeve 2, and on which the thread 4 is also formed. The tubular socket 29 can be referred to as the sleeve part 33 of the multi-part outer sleeve 2.

The inner sleeve 1 is provided at its axial end facing the bearing ring with a monolithically formed support ring 30, on the outer lateral surface of which the outer ring part 27 is radially supported. The bearing ring 30 can be used to drive the threaded nut.

FIG. 21 shows the situation before the inner holes are machined into the inner sleeve 1. FIG. 20 shows the finished through-holes 9.

Figure 22:
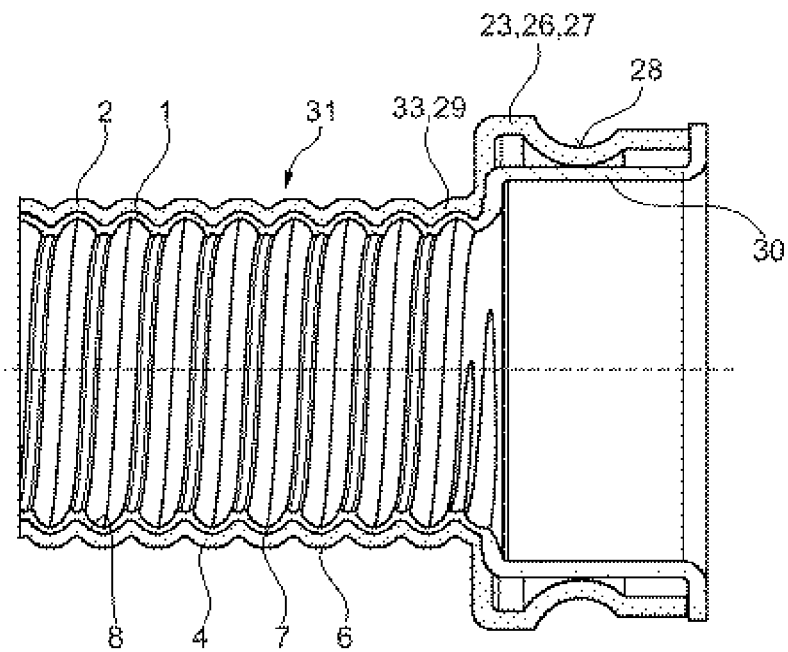
FIG. 22 shows the threaded nut according to a seventh variant in a longitudinal sectional view.

The threaded nut shown in FIG. 22 is a seventh exemplary embodiment. This threaded nut differs from the threaded nut according to the sixth exemplary embodiment only in that the through-holes—not shown here—were produced in the manner described for the exemplary embodiment according to FIGS. 1 to 5.

LIST OF REFERENCE SYMBOLS

1 Inner sleeve
2 Outer sleeve
3 Nut sleeve
4 Thread
5 Ball groove
6 Outer ridge
7 Inner ridge
8 Groove
9 Through-hole
10 Inner hole
11 Outer hole
12 Radial flange
13 Radial flange
14 Die
15 Die-side groove
16 Forming tool
17 Thread former
18 Formed edge section
19 Ball inlet ramp
20 Clamping section
21 Nut sleeve
22 Bearing ring
23 Connecting component
24 Clamping section
25 Socket
26 Bearing ring
27 Outer ring part
28 Ball groove
29 Tubular socket
30 Support ring
31 Nut sleeve
32 Sleeve part
33 Sleeve part

The invention claimed is:

1. A threaded nut of a ball screw, the threaded nut comprising:
    an inner sleeve constructed of sheet metal, and
    an outer sleeve constructed of sheet metal, the inner sleeve and the outer sleeve separately nested axially in one another to form a nut sleeve having a thread, the thread formed helically about a longitudinal axis of the threaded nut and forming: i) on an inner circumference of the nut sleeve, a ball groove wound helically about the longitudinal axis of the threaded nut and, ii) on an outer circumference of the nut sleeve, a helically wound outer ridge, such that the inner sleeve is threadedly engaged with the outer sleeve via the forming of the ball groove and the helically wound outer ridge so as to axially join the separately nested inner sleeve and the outer sleeve.

2. The threaded nut according to claim 1, wherein the nut sleeve forms an inner ridge wound helically about the longitudinal axis on the outer circumference of the inner sleeve, and the outer sleeve forms a helically wound groove configured to be engaged by the inner ridge of the inner sleeve.

3. The threaded nut according to claim 1, wherein at least one outer hole is formed along the thread on the outer sleeve, and a material of the inner sleeve is formed in the at least one outer hole.

4. The threaded nut according to claim 1, wherein the nut sleeve includes at least one through-hole configured for a return or deflection of balls along the thread, the at least one through-hole formed by an inner hole of the inner sleeve and by an outer hole of the outer sleeve.

5. The threaded nut according to claim 4, wherein the inner sleeve includes a formed edge section at an edge of the inner hole, the formed edge section forming a ball inlet ramp.

6. The threaded nut according to claim 5, wherein the through-hole is formed by a larger outer hole arranged on the outer sleeve and a smaller inner hole arranged on the inner sleeve.

7. The threaded nut according to claim 1, wherein the nut sleeve includes a connecting component on at least one axial end.

8. The threaded nut according to claim 7, wherein the inner sleeve and the outer sleeve include sleeve parts arranged to be axially adjacent, and one of the sleeve parts is also part of the connecting component.

9. The threaded nut according to claim 1, wherein the inner sleeve is constructed of sheet steel with a carbon content greater than 0.3% and the outer sleeve is constructed of sheet steel with a carbon content of less than 0.3%.

10. A method for producing the threaded nut according to claim 1, the method comprising:
nesting an inner sleeve constructed of sheet metal and an outer sleeve constructed of sheet metal axially in one another to form a nut sleeve,
inserting the nut sleeve into a die so that a groove on an inner circumference of the die extends helically about the longitudinal axis of the threaded nut,
moving a forming tool into the nut sleeve to form: i) a thread in the nut sleeve, the thread wound helically about a longitudinal axis and forming a helically wound ball groove on the inner circumference of the nut sleeve, and ii) a helically wound outer ridge extending along the thread on the outer circumference of the nut sleeve, the outer ridge formed via the groove on the inner circumference of the die.

11. The method for producing the threaded nut according to claim 10, wherein the outer sleeve includes at least one outer hole arranged along the thread before nesting with the inner sleeve to form the nut sleeve, and the forming tool forms material of the inner sleeve into the at least one outer hole to form a formed edge section in a region of an edge of the at least one outer hole.

12. A method for producing the threaded nut according to claim 9, the method comprising:
hardening the nut sleeve in a heat treatment process after forming the ball groove and the outer ridge so that the inner sleeve has a martensitic or a bainitic structure with a higher proportion of martensite or bainite than the outer sleeve.

13. A threaded nut of a ball screw, the threaded nut comprising:
a longitudinal axis,
an outer sleeve constructed of sheet steel, the outer sleeve having:
an outer circumference formed with an outer ridge extending helically about the longitudinal axis, and
an inner circumference formed with a groove extending helically about the longitudinal axis,
an inner sleeve constructed of sheet steel and separately disposed within the outer sleeve to form a nut sleeve, the inner sleeve having:
an inner circumference formed with a ball groove extending helically about the longitudinal axis, and
an outer circumference formed with an inner ridge extending helically about the longitudinal axis, the inner ridge threadedly engaging the groove formed on the inner circumference of the outer sleeve so as to axially join the separately disposed inner sleeve within the outer sleeve.

14. The threaded nut according to claim 13, wherein one of the outer sleeve or the inner sleeve further comprises an integrally formed first radial flange arranged at a first axial end of the nut sleeve.

15. The threaded nut according to claim 14, wherein a remaining one of the outer sleeve or the inner sleeve further comprises an integrally formed second radial flange arranged at a second axial end of the nut sleeve.

16. The threaded nut according to claim 14, wherein the first radial flange is formed with a ball groove configured for a ball bearing.

17. The threaded nut according to claim 16, wherein a remaining one of the outer sleeve or the inner sleeve further comprises an integrally formed second radial flange arranged at the first axial end, and the second radial flange is configured to support the first radial flange.

18. The threaded nut according to claim 13, wherein the nut sleeve further comprises a plurality of through-holes arranged on the circumference of the nut sleeve, the plurality of through-holes extending through the inner sleeve and the outer sleeve.

19. The threaded nut according to claim 18, wherein inner sleeve further comprises a first through-hole and the outer sleeve further comprises a second through-hole aligned with the first through-hole, and a portion of the second through-hole extends radially into the first through-hole.

20. A method for producing a threaded nut, the method comprising:
providing an outer sleeve constructed of sheet metal,
providing an inner sleeve constructed of sheet metal,
inserting the inner sleeve within the outer sleeve to form a nut sleeve,
inserting the nut sleeve into a die,
moving a forming tool into the nut sleeve so as to simultaneously form: i) a helically wound ball groove on an inner circumference of the inner sleeve, ii) a helically wound inner ridge on an outer circumference of the inner sleeve, iii) a helically wound groove on an inner circumference of the outer sleeve, the helically wound groove engaged with the helically wound inner ridge, and iv) a helically wound outer ridge on an outer circumference of the outer sleeve, the outer ridge formed via grooves arranged on the die.

* * * * *